US010997274B2

(12) United States Patent
Ito

(10) Patent No.: US 10,997,274 B2
(45) Date of Patent: May 4, 2021

(54) VARIABLE-SIZE PROBLEM SOLVING WITH SYSTOLIC ARRAYS

(71) Applicant: INTERNATIONAL BUSINESS MACHINES CORPORATION, Armonk, NY (US)

(72) Inventor: Megumi Ito, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 812 days.

(21) Appl. No.: 14/958,145

(22) Filed: Dec. 3, 2015

(65) Prior Publication Data

US 2017/0161611 A1    Jun. 8, 2017

(51) Int. Cl.
*G06F 17/16*    (2006.01)

(52) U.S. Cl.
CPC .................................. *G06F 17/16* (2013.01)

(58) Field of Classification Search
CPC ...... G06F 15/8046; G06F 17/16; G06F 17/18; G06F 5/8046
See application file for complete search history.

(56) References Cited

U.S. PATENT DOCUMENTS 5,471,627 A    11/1995  Means et al.
8,924,455 B1 *  12/2014  Barman ................ G06F 7/5443
                                                  708/607

OTHER PUBLICATIONS

Hwang, J-N., John A. Vlontzos, and S-Y. Kung. "A systolic neural network architecture for hidden Markov models."IEEE Transactions on Acoustics, Speech, and Signal Processing 37.12 (1989): 1967-1979. (Year: 1989).*
Null, Linda.The essentials of computer organization and architecture / Linda Null and Julia Lobur.—Fourth edition. Feb. 14, 2014. Entry on "Systolic Arrays". (Year: 2014).*
Louka, Basile, and Maurice Tchuente. "Dynamic programming on two-dimensional systolic arrays."Information Processing Letters 29.2 (1988): 97-104. (Year: 1988).*
Takagi, Toyokazu, and Tsutomu Maruyama. "Accelerating HMMER search using FPGA." 2009 International Conference on Field Programmable Logic and Applications. IEEE, 2009. (Year: 2009).*
Li, Jun, Yanhui Li, and Shuangping Chen. "The fast Viterbi algorithm caching Profile Hidden Markov Models on graphic processing units." 2011 IEEE International Conference on Computer Science and Automation Engineering. vol. 2. IEEE, 2011. (Year: 2011).*

(Continued)

*Primary Examiner* — Li B. Zhen
*Assistant Examiner* — Markus A. Vasquez
(74) *Attorney, Agent, or Firm* — Tutunjan & Bitetto, P.C.; Randall Bluestone

(57) ABSTRACT

Methods and systems for refactoring a problem include refactoring an original problem having a dimension that cannot be broken into an integer number of portions, each portion having a number of problem elements equal to a size of a systolic array, into a new problem having a dimension that can be broken into an integer number of portions, each portion having a number of problem elements equal to the size of the systolic array. The new problem is solved with the systolic array. The systolic array has a size defined by an integer number of processing elements and is configured to solve portions of problems having a number of problem elements equal to the number of processing elements.

20 Claims, 2 Drawing Sheets

(56) References Cited

OTHER PUBLICATIONS

Ferretti, Marco, and Davide Rizzo. "Handling borders in systolic architectures for the 1-D discrete wavelet transform for perfect reconstruction." IEEE Transactions on Signal Processing 48.5 (2000): 1365-1378. (Year: 2000).*
Milovanovic, E.I., et al; "Matrix-Vector Multiplication on a Fixed-Size Linear Systolic Array." Computers & Mathematics with Applications, Nov.-Dec. 2000, pp. 1189-1203, vol. 40, Issues 10-11, ScienceDirect.
Benkrid, Khaled, et al; "A High Pertormance Reconfigurable Core for Motif Searching Using Profile HMM." NASA/ESA Conference on Adaptive Hardware and Systems, Jun. 22-25, 2008, pp. 285-292.

* cited by examiner

VARIABLE-SIZE PROBLEM SOLVING WITH SYSTOLIC ARRAYS

BACKGROUND

Technical Field

The present invention relates to processing using systolic arrays and, more particularly, to solving problems that do not fit neatly into a respective array.

Description of the Related Art

Systolic arrays are used in, for example, field programmable gate arrays (FPGAs) to solve many different kinds of data processing problems. Examples include, for example, hidden Markov models and dynamic programming problems. In one example, a matrix input is provided that is larger than the size of the systolic array being used to solve the problem. To address this, conventional approaches split the matrix into a number of sub-matrices, each having a dimension that matches a number of processing elements (PEs) in the systolic array. For example, if an 8×10 input matrix is provided to a systolic array having four processing elements, the matrix may be split into two 4×10 matrices.

However, challenges arise when the input matrix cannot be split evenly. In other words, for an N×M matrix and P PEs, if N mod P≠0, such that the problem size of the last iteration is less than P, additional processing is needed. In a hardware-based solution, the result from all PEs is calculated and the actual result is selected later. This means the circuit needs to calculate and store the result at each PE, which is burdensome. Alternatively, the last row data may be selected from all of the PEs, but this necessitates a large multiplexer and additional routing complexity in the circuit layout. The hardware solutions are therefore expensive, particularly when a large number of PEs are used.

Another solution is to use padding. The endmost ceiling (N/P)P−N elements are padded with zeroes. However, padding is not applicable to a wide range of, e.g., hidden Markov model and dynamic programming problems.

SUMMARY

Methods and systems for refactoring a problem include refactoring an original problem having a dimension that cannot be broken into an integer number of portions, each portion having a number of problem elements equal to a size of a systolic array, into a new problem having a dimension that can be broken into an integer number of portions, each portion having a number of problem elements equal to the size of the systolic array. The new problem is solved with the systolic array. The systolic array has a size defined by an integer number of processing elements and is configured to solve portions of problems having a number of problem elements equal to the number of processing elements.

A method for solving a problem includes refactoring, using a processor, an original problem having a dimension that cannot be broken into an integer number of portions, each portion having a same size as a systolic array, into a new problem having a dimension that can be broken into an integer number of portions, each portion having the same size as the systolic array. The refactoring is performed by converting an input matrix, having a first dimension that cannot be evenly divided into the size of the systolic array, into a new matrix having a first dimension that can be evenly divided into the size of the systolic array, said new matrix comprising parameters of the input matrix and a set of new parameters for an extended portion of the new matrix. The new problem is solved by dividing the new problem into an integer number of portions, each portion having a same size as the systolic array and solving the portions of the new problem based on a stored result from a previous portion. The systolic array comprises an integer number of processing elements and a results buffer.

A system for refactoring a problem includes a systolic array having a size defined by an integer number of processing elements configured to solve a portion of a problem having a number of problem elements equal to the number of processing elements. A refactoring module has a processor configured to refactor an original problem having a dimension that cannot be broken into an integer number of portions, each portion having a number of problem elements equal to the size of the systolic array, into a new problem having a dimension that can be broken into an integer number of portions, each portion having a number of problem elements equal to the size of the systolic array.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention implement systolic arrays that can handle ill-fitting input matrices by refactoring the input matrix and problem to be solved such that the modified input matrix has a size that can be neatly divided into an integer number of the size of the systolic array. In other words, the systolic array performs some function $f(N,M)$ on an N×M matrix, where $M(i,j)$ is the expression for the element $(i,j)$ of the matrix. The new problem's input matrix is expressed as $N_{NEW} \times M$, where $N_{NEW}$ mod P=0 and $N < N_{NEW} < N+P$, which can be neatly divided into a systolic array having P processing elements (PEs).

Figure 1:
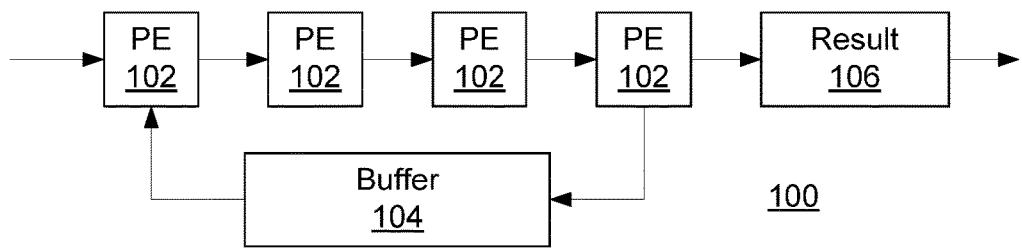
FIG. 1 is a block diagram of a systolic array in accordance with the present principles.

Referring now to the drawings in which like numerals represent the same or similar elements and initially to FIG. 1, a systolic array 100 is shown. The systolic array 100 includes a set of P PEs 102 and a buffer 104. Each PE 102 includes a specific processing function that it performs on incoming data. A single column of the input matrix, or of a sub-matrix of the input matrix, is fed into the line of PEs 102, one data value at a time. For example, for an array 100 having P PEs 102, the matrix values M(0,0), M(1,0), M(2,0), and M(3,0) are provided in sequence at first, followed by M(0,1), M(1,1), M(2,1), and M(3,1), and so on through the entire input. The buffer 104 provides the output of one column to be used in conjunction with the input of the next column. The result from the array is stored in a memory cell 106 and output.

Assuming a PE 102 produces an output at t=1 if given the input data at t=0, the systolic array 100 works as follows. At t=0, input data is provided to the first PE 102 which is needed to calculate M(0,0). The input data may, for example, represent initial values for M(0,0). At t=1, the value of M(0,0) is generated. That value is then used to calculate M(0,1) and M(1,0) values at the first and second PEs 102 respectively. In the next cycle, values for M(0,2), M(1,1), and M(2,0) are calculated at the first, second, and third PEs 102 respectively at time t=3. At t=4, the value M(3,0) is calculated at the fourth PE 102, and the value is stored into buffer 104 to be used to calculate M(0,5) in the next iteration. All of the values M(3, x) are stored in the buffer 104. The data dependency and the values to be stored in the buffer 104 can change by f(N,M). In this example, it is assumed that M(i,j) is based on M(i−1,j) and $M_{i,j}$−1). If M(i,j) is also based on M(i−2,j), then M(2,0) is also used to calculate M(4,0) in the first PE 102 in the next iteration, and the values M(2, x) are also stored in the buffer 104.

Figure 2:
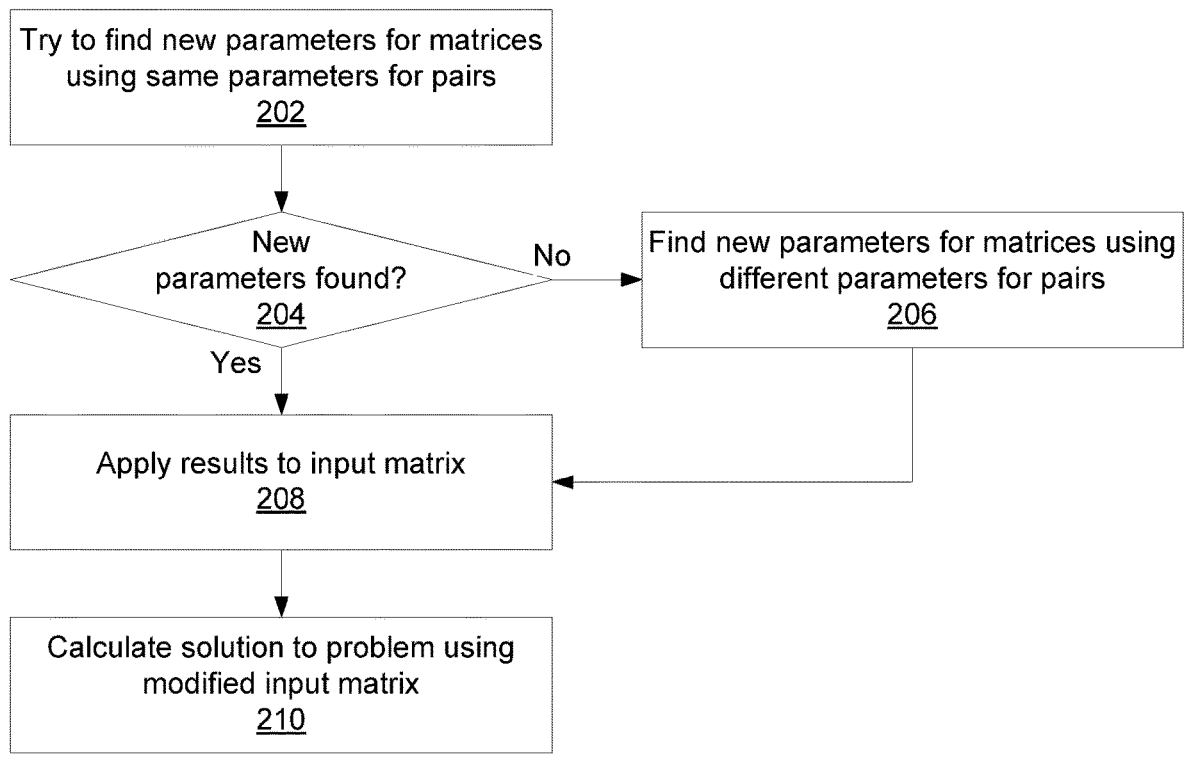
FIG. 2 is a block/flow diagram of a method for converting an original problem into a new problem that can be evenly divided into a systolic array in accordance with the present principles.

Referring now to FIG. 2, a method for reframing the problem is provided. It should be noted that the following steps are applied to the extended parts of the matrix and do not affect the matrix of the original problem. Block 202 tries to find new parameters for input matrices, with the parameters representing coefficients in the problem statement that appear separate from the matrix itself. This is performed keeping the parameters the same for any pair of values (i,j) in the extended part of the matrix. Block 204 determines whether such parameters are found. If not, block 206 finds new parameters, allowing parameters to differ for different pairs. It is possible that block 206 will fail to find a set of suitable parameters, in which case the present embodiments do not apply. Blocks 202 and 206 thereby generate an extended problem expression.

Block 208 generates a new matrix, $M_{ex}$ (i,j) based on the extended problem expression. The new matrix is used in the extended problem expression in block 210 to produce a result that is equivalent to the solution to the original problem.

In a first example, an original problem may be expressed as the following code:

```
for (i=0; i < N; i++) {
    for (j=0; j < M; j++) {
        A[i][j] = αA[i][j-1] + βA[i-1][j];
}}
result = A[N-1][M-1]
```

To split this problem with a remainder, the new problem would be expressed as:

```
for (k = 0; k < N/P; k++) { // Systolic array iteration
    for (i = 0; i < P; i++) {
        for (j = 0; j < M; j++) {
            A[k*P+i][j] = α*A[i][j-1] + β*A[i-1][j];
}}}
for (i = 0; i < N-floor(N/P)*P; i++) { // Last iteration
    for (j = 0; j < M; j++) {
        A[floor(N/P)*P+i][j] = α*A[i][j-1] + β*A[i-1][j];
}}
result = A[N-1][M-1];
```

However, the extended refactoring of the problem is expressed as:

```
for (k = 0; k < ceil(N/P); k++) { // Systolic array iteration
    for (i = 0; i < P; i++) {
        for (j = 0; j < M; j++) {
            if (k*P+i < N) { // Original calculation
                A[k*P+i][j] = α*A[i][j-1] + β*A[i-1][j];
            } else {
                // Modified calculation for the extended part
                A[k*P+i][j] = α(k,i)*A[i][j-1] + β(k,i)*A[i-1][j];
}}}}
result = A[ceil(N/P)-1][M-1]; // == A[N-1][M-1]
```

In this case, the extended part of the problem is modified to use the new parameters, α(k,i) and β(k,i). To create the extended part, the input matrix A is extended so that the width of the modified matrix A (expressed as N) mod P=0. The first part of the calculation is performed as normal. When the calculation reaches the new elements of the array (i.e., when k*P+i>=N), then the modified calculation is used for the remaining elements.

A second example is pair hidden Markov models for likelihood calculation in genomics. The original problem may be expressed, for example, as:

```
for (i = 0; i < n; i++) {
    for (j = 0; j < m; j++) {
        M[i][j] = (M[i-1][j-1]*a[i] + (X[i-1][j-1] + Y[i-1][j-1])*b[i]) * prior[i][j];
        X[i][j] = M[i-1][j]*c[i] + X[i-1][j]*d[i];
        Y[i][j] = M[i][j-1]*e[i] + Y[i][j-1]*f[i];
    }
}
for (j = 0; j < m; j++) { results += M[n-1][j] + X[n-1][j]; }
```

The parameters for the extended part of the calculation are found by finding parameters a[i], b[i], c[i], and d[i] for which the above produces the "results" output at n as it does at n+1. The following represent steps of the conversion:

$$(M[n][j]+X[n][j])=(M[n-1][j]+X[n-1][j])$$

$$((M[n-1][j-1]*a[n]+(X[n-1][j-1]+Y[n-1][j-1])*b[n]) *prior[n-1][j])+(M[n-1][j]*c[n]+X[n-1][j]*d[n] =(M[n-1][j]+X[n-1][j])//\text{Replace } M[n][j] \text{ and } X[n][j] \text{ based on the original problem.}$$

$$M[n-1][j]+X[n-1][j]=M[n-1][j]*c[n]+X[n-1][j]*d[n]+M[n-1][j-1]*a[n]*prior[n-1][j]+X[n-1][j-1]*b[n]*prior[n-1][j]+Y[n-1][j-1]*b[n]*prior[n-1][j]//\text{Expand the formula.}$$

//Create a system of equations based on the coefficients of each matrix element.

$1=c[n]$//Coefficients of $M[n-1][j]$ $1=d[n]$//Coefficients of $X[n-1][j]$ $0=a[n]*prior[n-1][j]$//Coefficients of $M[n-1][j-1]$ $0=b[n]*prior[n-1][j]$//Coefficients of $X[n-1][j-1]$ $0=b[n]*prior[n-1][j]$//Coefficients of $Y[n-1][j-1]$ //Solve the system of equations $prior[n-1][j]=0$ $a[n]=0$ $b[n]=0$ $c[n]=1$ $d[n]=1$ In this particular case, solving the extended problem results in a 22% logic reduction in the systolic array needed to solve the problem, in contrast with implementations that compute the result at each PE. The result expression above can then be simplified to be results $+=X[n_{new}-1][j]$.

In a third example, a Viterbi method for pair hidden Markov models is expressed as solving $v^E(n)=v^E(n+1)$ as follows, replacing the parameters $\delta$, $\varepsilon$, and $\tau$ in $v^E(n)$ with $\delta_1$, $\delta_2$, $\delta_3$, $\varepsilon_1$, $\varepsilon_2$, $\varepsilon_3$, $\varepsilon_4$, $\tau_1$, $\tau_2$, and $\tau_3$. An example of the conversion of the problem to a new problem is shown below.

The problem is expressed as $v^E=\tau_{max}(v^M(n, m), v^X(n, m), v^Y(n, m))=\tau_{max}(v^M(n+1, m), v^X(n+1, m), v^Y(n+1, m))$, where $v^M(i, j)$, $v^X(i, j)$, and $v^Y(i, j)$ are defined iteratively, with the following initial conditions:

$v^M(0,0)=1$, $v^X(0,0)=v^Y(0,0)=0$, all $v^*(i, -1)=v^*(-1,j)=0$, and all $v^*(i, 0)=v^*(0, j)=0$, and where:

$$v^M(i, j) = p_{x_i,y_j}\max\begin{cases}(1-2\delta-\tau)v^M(i-1, j-1)\\(1-\varepsilon-\tau)v^X(i-1, j-1)\\(1-\varepsilon-\tau)v^Y(i-1, j-1)\end{cases},$$

$$v^X(i, j) = q_{x_i}\max\begin{cases}\delta v^M(i-1, j)\\ \varepsilon v^X(i-1, j)\end{cases}, \text{ and}$$

$$v^Y(i, j) = q_{y_j}\max\begin{cases}\delta v^M(i, j-1)\\ \varepsilon v^Y(i, j-1)\end{cases}.$$

//Replace $v^Y(n, m)$, $v^M(n+1, m)$, $v^X(n+1, m)$, and $v^Y(n+1, m)$ based on the original program:

$\max(v^M(n,m),v^X(n,m),q_{ym}\max(\delta v^M(n,m-1),\varepsilon v^Y(n,m-1)))=\max(p_{xn+1ym}\max((1-2\delta-\tau)v^M(n,m-1),(1-\varepsilon-\tau)v^X(n,m-1),(1-\varepsilon-\tau)v^Y(n,m-1)),q_{xn+1}\max(\delta v^M(n,m),\varepsilon v^X(n,m)),q_{ym}\max(\delta v^M(n+1,m-1),\varepsilon v^Y(n+1,m-1)))$ //Expand the formula:

$\max(v^M(n,m),v^X(n,m),q_{ym}\max(\delta v^M(n,m-1),\varepsilon v^Y(n,m-1)))=\max(p_{xn+1ym}\max((1-2\delta_1\tau_1)v^M(n,m-1),(n,m-1),(1-\varepsilon_1-\tau_1)v^X(n,m-1),(1-\varepsilon_2-\tau_3)v^Y(n,m-1)),q_{xn+1}\max(\delta_2 v^M(n,m),\varepsilon_3 v^X(n,m)),q_{ym}\max(\delta_3 v^M(n+1,m-1),\varepsilon_4 v^Y(n+1,m-1)))$ //Create a system of equations based on the coefficients of each matrix element:

$1=q_{xn+1}\delta_2$ //Coefficients of $v^M(n,m)$ $1=q_{xn+1}\varepsilon_3$ //Coefficients of $v^X(n,m)$ $q_{ym}\delta=p_{xn+1ym}(1-2\delta_{1-\tau 1})$ //Coefficients of $v^M(n,m-1)$ $q_{ym\varepsilon}=p_{xn+1ym}(1_{-2-\tau 3})$ //Coefficients of $v^Y(n,m-1)$ $0=p_{xn+1ym}(1_{-\varepsilon 1-\tau 2})$ //Coefficients of $v^X(n,m-1)$ $0=q_{ym\delta 3}$ //Coefficients of $v^M(n+1,m-1)$ $0=q_{ym\varepsilon 4}$ //Coefficients of $v^Y(n+1,m-1)$ //Solve the system of equations (below is an exemplary set of applicable values):

$q_{xn+1}=1$
$p_{xn+1ym}=q_{ym}$
$q_{ym}=q_{ym}$
$\delta_1=-\delta/2$
$\delta_2=1$
$\delta_3=0$
$\tau_1=1$
$\tau_2=1$
$\tau_3=1$
$\varepsilon_1=0$
$\varepsilon_2=-\varepsilon$
$\varepsilon_3=1$
$\varepsilon_4=0$ To find parameters for the extended part of the calculation, the solution of $v^E(n)=v^E(n+1)$ is computed. However, this cannot be done with the same parameters as in the original problem. Instead, the original parameters ($\delta$, $\varepsilon$, and $\tau$) are replaced with a new set of parameters (($\delta_1$, $\delta_2$, $\delta_3$, $\varepsilon_1$, $\varepsilon_2$, $\varepsilon_3$, $\varepsilon_4$, $\tau_1$, $\tau_2$, and $\tau_3$).

The result expression can then be simplified to $v^E=\tau\max(v^M(n,m), v^X(n,m))$.

As noted above, block 202 seeks to find values for the parameters that satisfy $f(N,M)=f(N_{new},M)$. For a problem that uses multiple matrix element expressions, such as Ma(i,j), Mb(i,j), and Mc(i,j) (denoted generally as M*(i,j)), the parameters are all of the coefficients that appear in M*(i,j). The right side of the equation (i.e., the "result" of the new problem) is converted by applying M*(i,j) expressions until all of the matrix elements that appear in the left side of the equation appear in the right side. The parameters are the same for any pair of values (i,j). This involves converting or transforming the expression on the right-hand side of the equation $f(N,M)=f(N_{new},M)$ by replacing the matrix elements with the expressions used to determine them.

Block 202 then creates new equations from the converted equation by placing the coefficients of a matrix element in the converted equation at each side of a new equation based on the coefficients of matrix elements in the converted equation. There will be as many new equations as the number of matrix elements that appear in the converted equation. If a matrix element appears on both sides of the converted equation, the left side of the new equation will be the coefficient of the respective matrix element on the left side of the converted equation, while the right side of the new equation will be the coefficient of the respective matrix element in the right side of the converted equation. If there are matrix elements in the right side of the converted equation which don't appear on the left side, the left side of the new equation for that matrix element is set to zero, while the right side of the new equation is set to the coefficient of the respective matrix element on the right side of the converted equation. There will not be any matrix elements that appear only on the left side of the converted equation because of the conversion process. The system of equations, which includes the newly created equations, is solved to produce a result of the parameter values for the extended part. If this cannot be done, then block 204 determines that new parameters will be needed in block 206.

Block 206 largely performs the same steps as block 202, except that different (i,j) pairs may have different parameters set. Assuming the coefficients include at least some variables, different variables may be set for each pair. If a coefficient has a value with no variable, the coefficient is replaced with a variable. Different coefficients are used to calculate different matrix elements by providing the coefficients to be used for a matrix element to the PEs 102 at the time of calculation.

Block 208 uses the expression of matrix elements of the extended part of the problem (denoted herein as Mex(i,j)). Mex(i,j) is obtained by converting the parameters in M(i,j) to the results of block 202/206. When the result is obtained from block 206, Mex(i,j) will vary according to the pair (i,j). Block 208 uses Mex(i,j) to calculate the matrix elements of the extended part of the problem. This lets block 210 calculate $f(N_{new}, M)$ to get the results for the original problem.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 3:
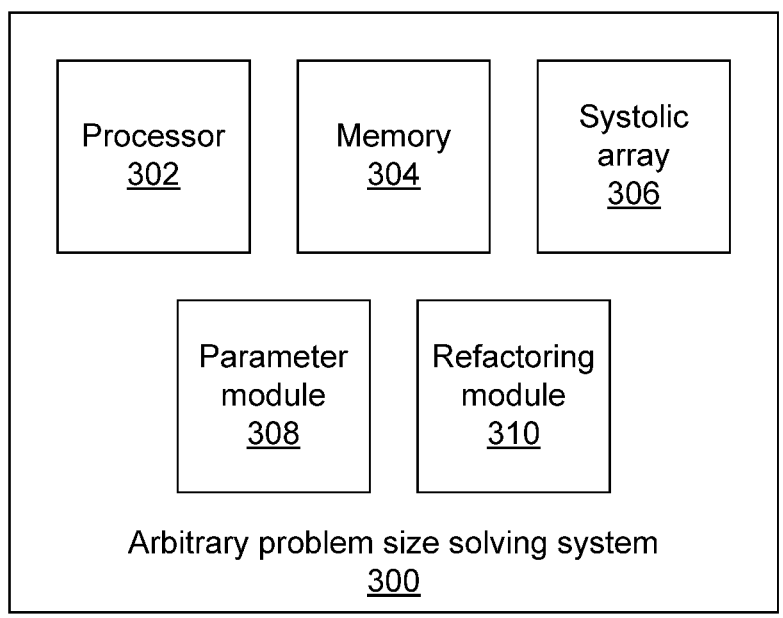
FIG. 3 is a block diagram of a system for converting an original problem into a new problem that can be evenly divided into a systolic array in accordance with the present principles.

Referring now to FIG. 3, a system 300 for solving problems of arbitrary size is shown. The system 300 includes a hardware processor 302 and memory 304 which stores a problem and corresponding data. The system 300 includes one or more modules, each of which may be implemented as software running on the processor 302. Alternatively, the modules may be implemented as stand-alone hardware devices in the form of, e.g., an application specific integrated chip or field programmable gate array. The system further includes a systolic array 306 as shown above, which may be part of the processor 302 or may be formed from separate hardware.

When a problem does not fit neatly into the systolic array 306 (i.e., when the problem cannot be broken up into chunks that fit the array), a parameter module 308 uses the processor 302 to determine a set of new parameters to use for a resized problem that can be broken up into such chunks. A refactoring module 310 creates a new problem using the parameters provided by parameter module 308 to have the same output while still fitting neatly into systolic array 306.

It should be noted that the system 300 is a special purpose device, having a systolic array 306 that performs specified kinds of processing suitable to the specific problem at hand. It is particularly contemplated that the system 300 may be especially efficient at matrix mathematics, providing a flexibility heretofore unseen in in systolic array implementations.

It should be recognized that the present embodiments dramatically increase the efficiency of solving problems with sizes that cannot be neatly divided into the elements of a systolic array. The above embodiments thereby provide distinct advances in data processing, which is a basic function of a computer. As a result, the present embodiments represent an improvement in the functioning of the computer itself.

Having described preferred embodiments of variable-size problem solving with systolic arrays (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for increasing the efficiency of systolic array processing to solve a problem, comprising:
   implementing a systolic array comprising a plurality of processing elements (PEs) and a single buffer, each of the PEs being configured for executing a specific processing function on incoming data, the buffer providing output from one column used in conjunction with input of a next column, wherein values at a first PE and a second PE are stored into the buffer and are utilized to calculate subsequent iterations for additional PEs;
   reparametrizing, using a processor coupled to the systolic array, an original problem, expressed as a matrix having a dimension that is indivisible into an integer number of portions having a number of problem elements equal to a size of the systolic array, into a reparametrized problem, having a dimension divisible into an integer number of portions having a number of problem elements equal to the size of the systolic array, by replacing each matrix element of the original problem with an expression used to determine the matrix element and solving the expression of each matrix element to generate parameter values for an extended part of the original problem; and
   solving the reparametrized problem with the systolic array, said systolic array having a size defined by an integer number of processing elements and being configured to solve portions of problems having a number of problem elements equal to the number of processing elements such that a last iteration of systolic array processing of a portion of the reparametrized problem includes each processing element processing a reparametrized problem element, to reduce systolic array logic utilized for solving the reparametrized problem in comparison to solving the original problem.

2. The method of claim 1, wherein the input matrix has a first dimension that cannot be evenly divided by the size of the systolic array and the reparametrized matrix has a first dimension that can be evenly divided by the size of the systolic array.

3. The method of claim 2, wherein converting the input matrix comprises determining new parameters and applying a same set of parameters to each matrix element for all matrix element index value pairs.

4. The method of claim 2, wherein converting the input matrix comprises determining new parameters and applying different parameters to at least one matrix element than those applied to another matrix element.

5. The method of claim 2, wherein the reparametrized matrix comprises elements of the input matrix and further comprises a set of new parameters for elements of an extended portion of the reparametrized matrix.

6. The method of claim 1, wherein the reparametrized problem has the same solution as the solution of the original problem.

7. The method of claim 1, further comprising solving the reparametrized problem by dividing the reparametrized problem into an integer number of portions, each portion having a same size as the systolic array.

8. The method of claim 7, wherein the systolic array comprises an integer number of processing elements and a results buffer.

9. The method of claim 8, wherein solving the reparametrized problem comprises iteratively solving the portions of the reparametrized problem based on a stored result from a previous portion.

10. A computer readable storage medium comprising a computer readable program for increasing the efficiency of systolic array processing to solve a problem, wherein the computer readable program when executed on a computer causes the computer to perform the steps of:
   implementing a systolic array comprising a plurality of processing elements (PEs) and a single buffer, each of the PEs being configured for executing a specific processing function on incoming data, the buffer providing output from one column used in conjunction with input of a next column, wherein values at a first PE and a second PE are stored into the buffer and are utilized to calculate subsequent iterations for additional PEs;
   reparametrizing, using a processor coupled to the systolic array, an original problem, expressed as a matrix having a dimension that is indivisible into an integer number of portions having a number of problem elements equal to a size of the systolic array, into a reparametrized problem, having a dimension divisible into an integer number of portions having a number of problem elements equal to the size of the systolic array, by replacing each matrix element of the original problem with an expression used to determine the matrix element and solving the expression of each matrix element to generate parameter values for an extended part of the original problem; and
   solving the reparametrized problem with the systolic array, said systolic array having a size defined by an integer number of processing elements and being configured to solve portions of problems having a number of problem elements equal to the number of processing elements such that a last iteration of systolic array processing of a portion of the reparametrized problem includes each processing element processing a reparametrized problem element, to reduce systolic array logic utilized for solving the reparametrized problem in comparison to solving the original problem.

11. A system for increasing the efficiency of systolic array processing to solve a problem, comprising:
   a systolic array comprising a single buffer and having a size defined by an integer number of processing elements (PEs) configured to solve a portion of a problem having a number of problem elements equal to the number of processing elements, each of the PEs being configured for executing a specific processing function on incoming data, the buffer providing output from one column used in conjunction with input of a next column, wherein values at a first PE and a second PE are stored into the buffer and are utilized to calculate subsequent iterations for additional PEs;
   a refactoring module comprising a processor configured to reparametrize an original problem, expressed as a matrix having a dimension that is indivisible into an integer number of portions having a number of problem elements equal to a size of the systolic array, into a reparametrized problem, having a dimension divisible into an integer number of portions having a number of problem elements equal to the size of the systolic array, by replacing each matrix element of the original problem with an expression used to determine the matrix element and solving the expression of each matrix element to generate parameter values for an extended part of the original problem; and
   wherein the systolic array is further configured to solve the reparametrized problem such that a last iteration of systolic array processing of a portion of the reparametrized problem includes each processing element processing a reparametrized problem element, to reduce systolic array logic utilized for solving the reparametrized problem in comparison to solving the original problem.

12. The system of claim 11, wherein the input matrix has a first dimension that cannot be evenly divided by the size of the systolic array and the reparametrized matrix has a first dimension that can be evenly divided by the size of the systolic array.

13. The system of claim 12, further comprising a parameter module configured to determine new parameters and apply a same set of parameters to each matrix element for all matrix element index value pairs.

14. The system of claim 12, further comprising a parameter module configured to determine new parameters and apply different parameters to at least one matrix element than those applied to another matrix element.

15. The system of claim 12, wherein the reparametrized matrix comprises elements of the input matrix and further comprises a set of new parameters for elements of an extended portion of the reparametrized matrix.

16. The system of claim 11, wherein the reparametrized problem has the same solution as the solution of the original problem.

17. The system of claim 11, wherein the refactoring module is configured to divide the reparametrized problem into an integer number of portions, each portion having a same size as the systolic array, and to solve the reparametrized problem.

18. The system of claim 17, further comprising a memory comprising data corresponding to at least one of the original problem or the reparametrized problem and wherein the systolic array comprises an integer number of processing elements and a results buffer.

19. The system of claim 18, wherein the systolic array is further configured to iteratively solve the portions of the reparametrized problem based on a stored result from a previous portion.

20. The method of claim 1, wherein the new parameters represent coefficients in a problem statement that are separate from the input matrix and the reparametrized matrix.

* * * * *